(12) United States Patent
Puryk et al.

(10) Patent No.: US 10,375,885 B2
(45) Date of Patent: Aug. 13, 2019

(54) SYSTEM FOR CHOPPING AND SPREADING RESIDUE

(71) Applicant: Deere & Company, Moline, IL (US)

(72) Inventors: Corwin M. Puryk, Bettendorf, IA (US); Christopher J. Faulkner, Eldridge, IA (US)

(73) Assignee: Deere & Company, Moline, IL (US)

( * ) Notice: Subject to any disclaimer, the term of this patent is extended or adjusted under 35 U.S.C. 154(b) by 195 days.

(21) Appl. No.: 15/260,584

(22) Filed: Sep. 9, 2016

(65) Prior Publication Data

US 2017/0079207 A1 Mar. 23, 2017

Related U.S. Application Data

(60) Provisional application No. 62/219,821, filed on Sep. 17, 2015.

(51) Int. Cl.
| | |
|---|---|
| *A01D 41/12* | (2006.01) |
| *A01F 12/18* | (2006.01) |
| *A01F 12/30* | (2006.01) |
| *A01F 12/40* | (2006.01) |
| *A01F 12/44* | (2006.01) |

(52) U.S. Cl.
CPC .......... *A01D 41/1243* (2013.01); *A01F 12/18* (2013.01); *A01F 12/30* (2013.01); *A01F 12/40* (2013.01); *A01F 12/44* (2013.01)

(58) Field of Classification Search
CPC ..... A01D 41/1243; A01F 12/18; A01F 12/40; A01F 12/44; A01F 12/30; A01F 12/442
See application file for complete search history.

(56) References Cited

U.S. PATENT DOCUMENTS

| | | | | |
|---|---|---|---|---|
| 640,939 | A * | 1/1900 | Paul et al. ............. | A01F 12/00 460/73 |
| 2,301,536 | A * | 11/1942 | Greenwood ............ | A01F 12/20 241/293 |
| 3,469,773 | A * | 9/1969 | Everett .................... | A01F 12/48 415/185 |
| 3,762,537 | A * | 10/1973 | Lutz ........................ | B65G 33/00 100/145 |
| 4,007,999 | A * | 2/1977 | Serizawa .............. | F04D 29/283 416/178 |

(Continued)

FOREIGN PATENT DOCUMENTS

| | | |
|---|---|---|
| CN | 201278688 Y | 7/2009 |
| DE | 850818 C | 9/1952 |

(Continued)

OTHER PUBLICATIONS

European Search Report in foreign counterpart application No. 16188918.3 dated Jan. 2, 2017 (7 pages).

*Primary Examiner* — Thomas B Will
*Assistant Examiner* — Joan D Misa
(74) *Attorney, Agent, or Firm* — Rathe Lindenbaum LLP

(57) ABSTRACT

A system of chopping and spreading residue for an agricultural combine comprises a chopper disposed in front of a residue accelerator at the rear of an agricultural combine. The chopper is disposed to receive crop residue from a threshing and separating section of the combine and to chop that residue into smaller portions, the residue accelerator is disposed behind the chopper to receive the chopped crop residue from the chopper, and to accelerate it.

20 Claims, 12 Drawing Sheets

(56) References Cited

U.S. PATENT DOCUMENTS

| | | | | |
|---|---|---|---|---|
| 4,137,923 A * | 2/1979 | Druffel | A01D 41/1243 | 460/112 |
| 4,526,180 A * | 7/1985 | Scott | A01F 12/40 | 239/672 |
| 4,637,406 A * | 1/1987 | Guinn | A01F 12/40 | 241/101.71 |
| 4,653,515 A * | 3/1987 | Tophinke | A01F 12/10 | 460/78 |
| 4,906,219 A * | 3/1990 | Matousek | A01F 12/444 | 415/203 |
| 5,112,279 A * | 5/1992 | Jensen | A01F 12/442 | 460/69 |
| 5,232,405 A * | 8/1993 | Redekop | A01F 12/40 | 460/112 |
| 6,416,405 B1 * | 7/2002 | Niermann | A01D 41/1243 | 241/186.3 |
| 6,547,169 B1 * | 4/2003 | Matousek | A01D 41/1243 | 239/149 |
| 6,551,186 B2 * | 4/2003 | Voss | A01F 7/067 | 460/113 |
| 6,656,038 B1 * | 12/2003 | Persson | A01D 41/1243 | 460/112 |
| 6,736,721 B2 * | 5/2004 | Niermann | A01D 41/1243 | 460/112 |
| 6,881,145 B2 * | 4/2005 | Holmen | A01D 41/1243 | 460/112 |
| 6,893,340 B1 * | 5/2005 | Schmidt | A01D 41/1243 | 239/650 |
| 7,044,853 B2 * | 5/2006 | Weichholdt | A01D 41/1243 | 460/112 |
| 7,066,810 B2 * | 6/2006 | Farley | A01D 41/1243 | 460/112 |
| 7,651,391 B2 * | 1/2010 | Weichholdt | A01D 41/1243 | 460/111 |
| 7,867,072 B2 * | 1/2011 | Lauwers | A01D 41/1243 | 460/112 |
| 7,927,200 B2 * | 4/2011 | Van Overschelde | A01F 12/40 | 460/112 |
| 7,993,188 B2 * | 8/2011 | Ritter | A01F 12/40 | 460/111 |
| 8,109,815 B2 * | 2/2012 | Hollatz | A01F 12/10 | 460/16 |
| 8,118,652 B2 * | 2/2012 | Hollatz | A01F 12/10 | 460/113 |
| 8,821,229 B2 * | 9/2014 | Stan | A01F 12/444 | 460/99 |
| 9,043,959 B2 * | 6/2015 | Esken | A01F 12/10 | |
| 9,750,192 B2 * | 9/2017 | Mackin | A01F 12/444 | |
| 2002/0187820 A1 * | 12/2002 | Voss | A01F 7/067 | 460/73 |
| 2012/0186945 A1 * | 7/2012 | Laughlin | B65G 39/073 | 198/494 |
| 2013/0263565 A1 * | 10/2013 | Yde | A01D 41/1243 | 56/122 |
| 2013/0341162 A1 * | 12/2013 | Kowalski | B65G 23/04 | 198/842 |
| 2014/0298766 A1 * | 10/2014 | Furmaniak | A01F 12/56 | 56/14.6 |
| 2015/0050969 A1 * | 2/2015 | Knierbein | A01D 41/1243 | 460/112 |
| 2017/0280628 A1 * | 10/2017 | Verhoeven | A01F 7/04 | |

FOREIGN PATENT DOCUMENTS

| | | | | |
|---|---|---|---|---|
| DE | 3615151 A1 | 11/1987 | | |
| EP | 1269822 A1 * | 1/2003 | | A01D 41/1243 |
| EP | 2384610 A2 * | 11/2011 | | A01D 41/1243 |

* cited by examiner

SYSTEM FOR CHOPPING AND SPREADING RESIDUE

RELATED APPLICATION

This document claims priority and the benefit of the filing date based on U.S. provisional application No. 62/219,821, filed Sep. 17, 2015 under 35 U.S.C. § 119 (e), where the provisional application is hereby incorporated by reference herein.

FIELD OF THE INVENTION

The invention relates to agricultural combines. More particularly it relates to methods for distributing agricultural residue over the ground.

BACKGROUND OF THE INVENTION

Agricultural combines separate crop plants from the field, then separate the crop plants into a crop portion and a residue portion. The crop portion is saved within the agricultural combine for later transfer to storage facilities, and the residue portion is distributed over the ground.

Crop residue is typically chopped into short pieces before it is distributed over the ground. This chopping is performed by residue choppers that are typically constructed as a drum from which short blades are suspended. As this drum rotates the blades extending from the drum hit the stalks of the crop plant and cut them against a row of stationary blades.

Once the crop is chopped, it is thrown out the rear of the combine and is spread over the ground. Typically, a row of steering vanes are provided behind the chopper to spread the chopped plant stalks to the left and to the right of the combine.

One problem with this arrangement is the velocity of the chopped crop plants. They must have a relatively high velocity to be chopped, bounced against steering vanes, and continue onward 5-10 m to the left and to the right of the combine.

One way to improve the velocity of the chopped up plant stalks is to operate the chopper at a high rate of speed, such as 3000 RPM. Another way is to add fan blades to the chopper that will increase the air flow through the chopper, and thus blow the chopped crop plants farther away from the vehicle.

When these solutions are adopted, the chopper consumes significantly more power. Further, since it is the chopper that provides the impetus to the chopped crop plants, the chopper speed cannot be varied to control the quality of the chopping, but must operate at a very high speed in order to ensure the chopped crop plants are widely distributed.

What is needed, therefore, is a system of chopping and spreading residue that permits the chopper to operate more efficiently, and to chop more effectively, yet provide a wide distribution of chopped crop plants behind the combine. It is an object of this invention to provide such a system.

SUMMARY OF THE INVENTION

In accordance with a first aspect of the invention a system of chopping and spreading residue in an agricultural combine is provided that comprises a chopper disposed in a crop residue flow path to receive crop residue from a threshing and separating mechanism, the chopper having a rotational axis that extends horizontally and transversely to a harvesting direction of travel; a residue accelerator disposed downstream of the chopper to receive chopped residue from the chopper and to accelerate the chopped residue; a residue spreader disposed downstream of the residue accelerator to spread the chopped residue accelerated by the residue accelerator; wherein the residue accelerator further comprises an elongate drum having a rotating axis that is disposed horizontally and transversely to the harvesting direction of travel of the agricultural combine, a plurality of rings extending about the elongate drum and fixed to the elongate drum, a plurality of vanes extending between and fixed to each adjacent pair of rings, a vane extension removably fixed to each of the plurality of vanes.

Each of the plurality of rings may have a plurality of extensions extending outwardly from a central region of each said ring, and further wherein the plurality of vanes extending between and fixed to each adjacent pair of rings is fixed to the extensions.

Each ring of the plurality of rings may define a central circular hole that extends about and is fixed to an outer surface of the elongate drum.

The system may further comprise a plurality of threaded fasteners, and each vane of the plurality of vanes has a plurality of holes that are aligned with a corresponding plurality of holes in a vane extension, and the vane extension may be removably fixed to each of the plurality of vanes with at least one of the plurality of threaded fasteners, and the at least one of the plurality of threaded fasteners may extend through the aligned holes of the vanes and the vane extensions.

The chopper may comprise an elongate drum and a plurality of chopping blades attached to the elongate drum to extend outward from the elongate drum and be supported on the elongate drum to pivot with respect to the elongate drum.

The system may further comprise a first pulley fixed to the elongate drum of the residue accelerator to drive the elongate drum of the residue accelerator in rotation; a second pulley fixed to the elongate drum of the chopper to drive the elongate drum of the chopper in rotation; and an endless belt extending around and coupling the first pulley and the second pulley, wherein the second pulley drives the first pulley in rotation.

The first pulley may have a smaller diameter than the second pulley, and the endless belt may drive the first pulley at a higher rotational speed than the second pulley.

In accordance with another aspect of the invention, an agricultural combine may comprise a threshing system, a separating system, and a cleaning system for separating grain from crop residue, and also a system for chopping and spreading that residue in accordance with claim 1.

DETAILED DESCRIPTION

Figure 1:
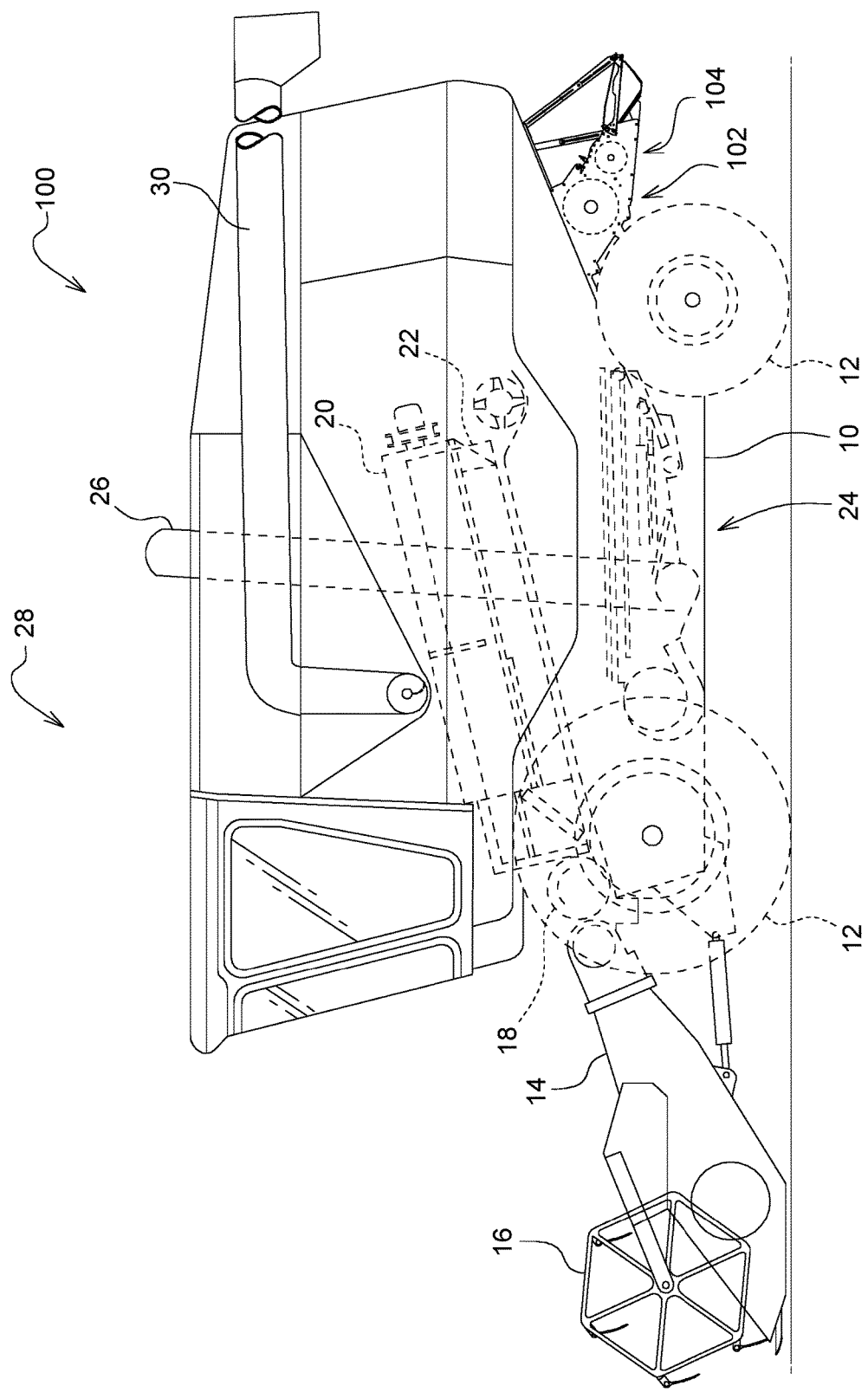
FIG. 1 is a side view of an agricultural combine in accordance with the present invention.
Figure 2:
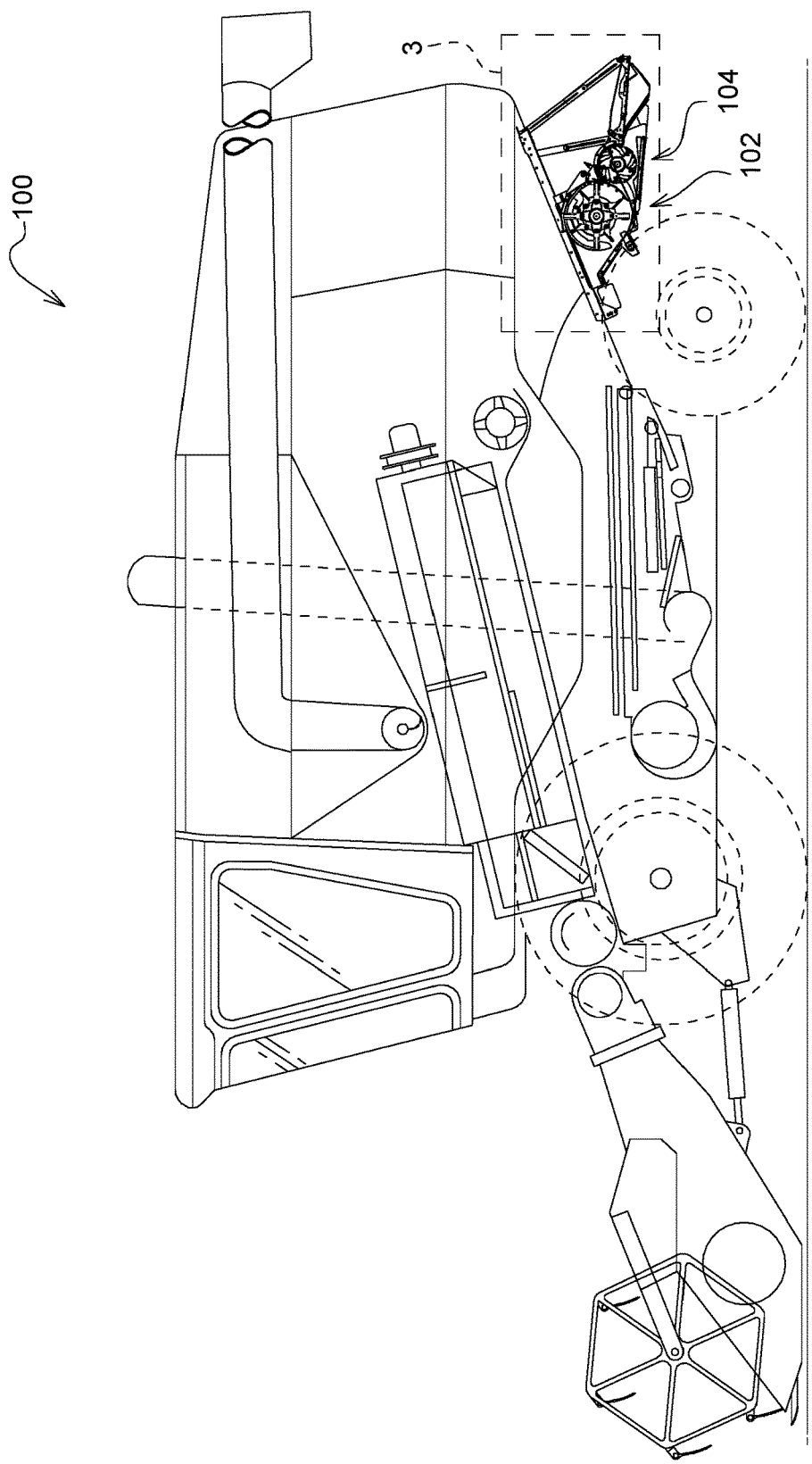
FIG. 2 is a side view of an agricultural combine in accordance with the present invention showing a chopper and residue accelerator in greater detail.
Figure 3:
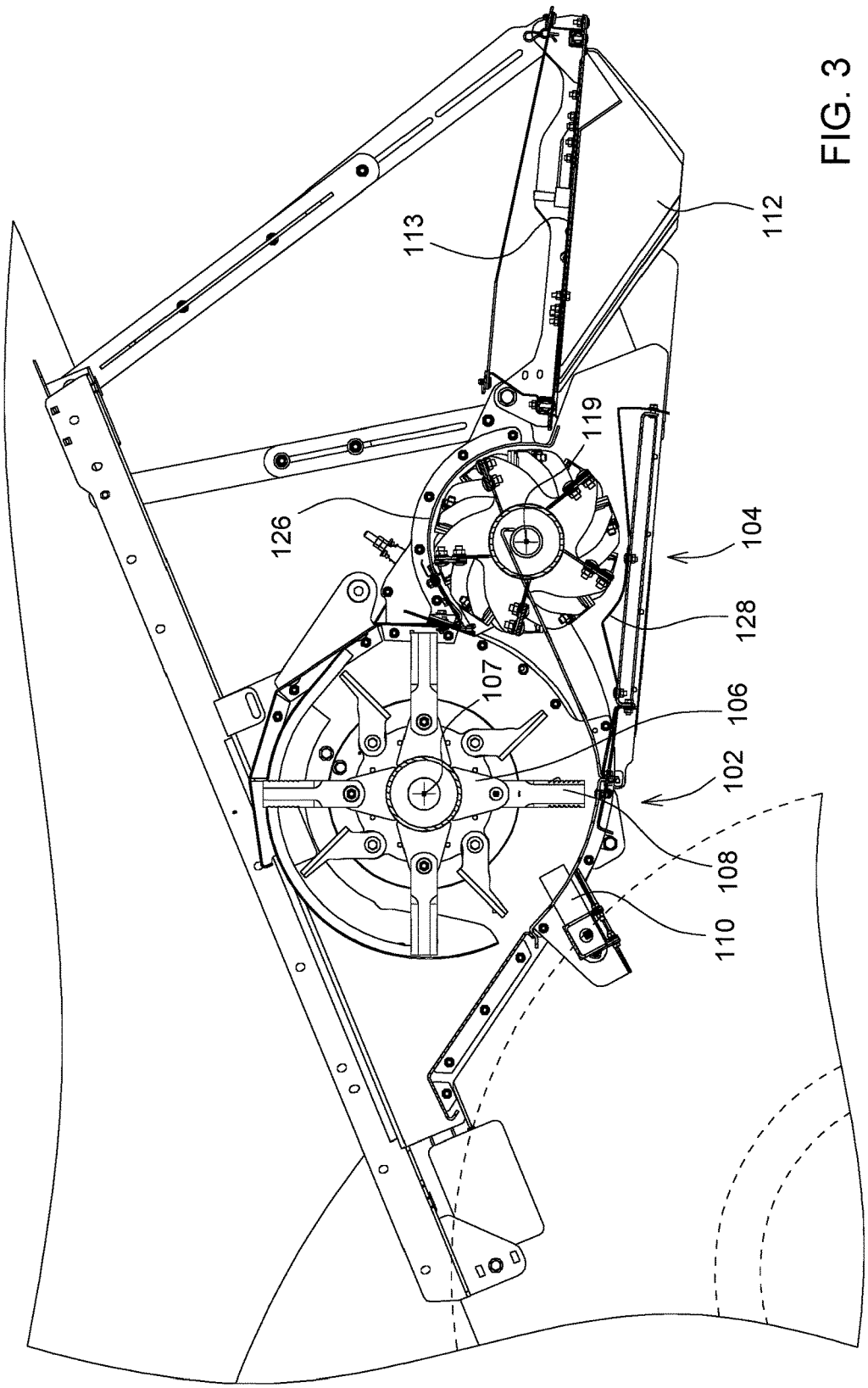
FIG. 3 is a fragmentary detailed side view of the chopper and residue accelerator of FIG. 2.
Figure 4:
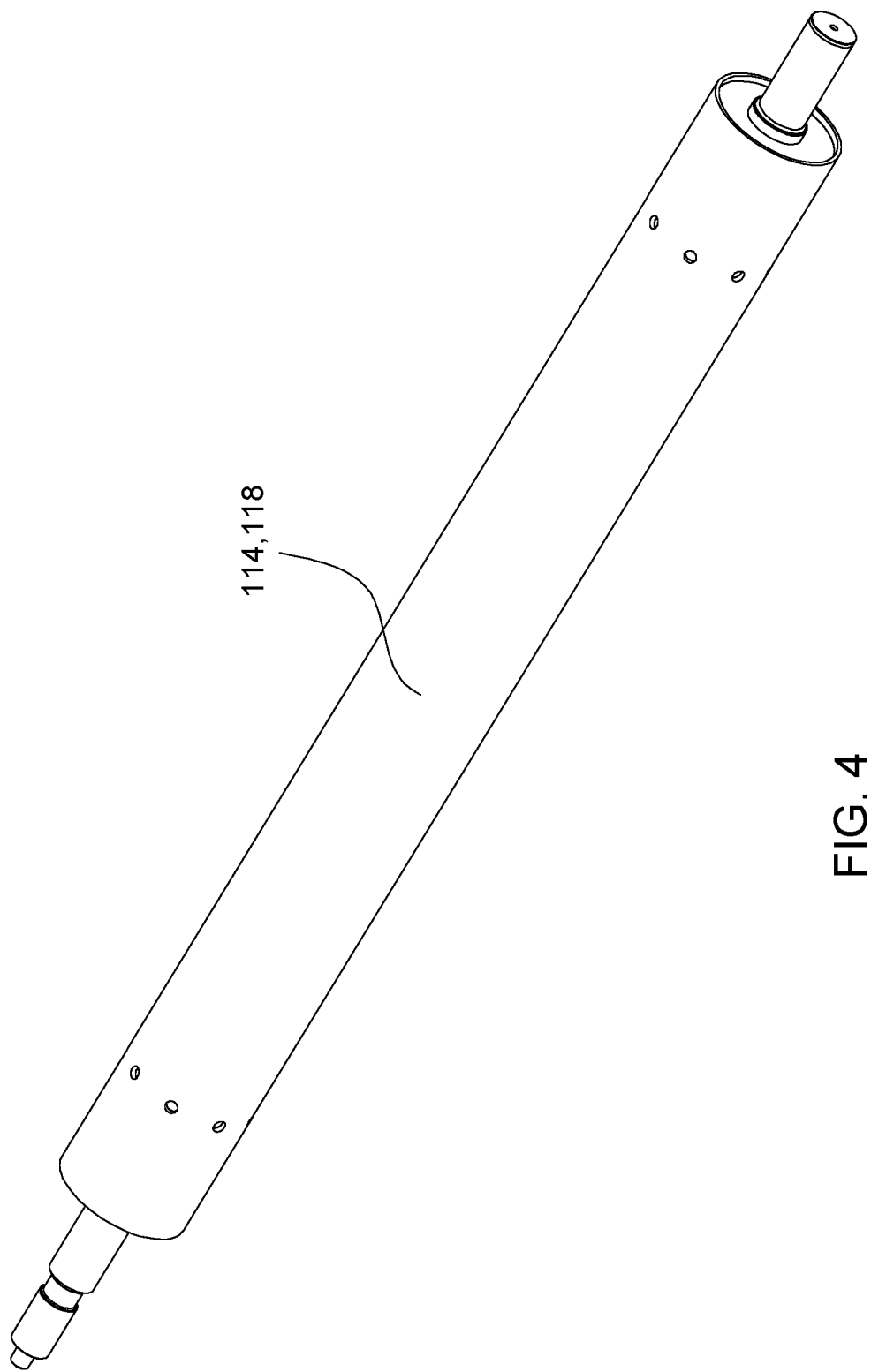
FIG. 4 is a perspective view of the elongate drum and rotor of the residue accelerator of the foregoing figures.
Figure 5:
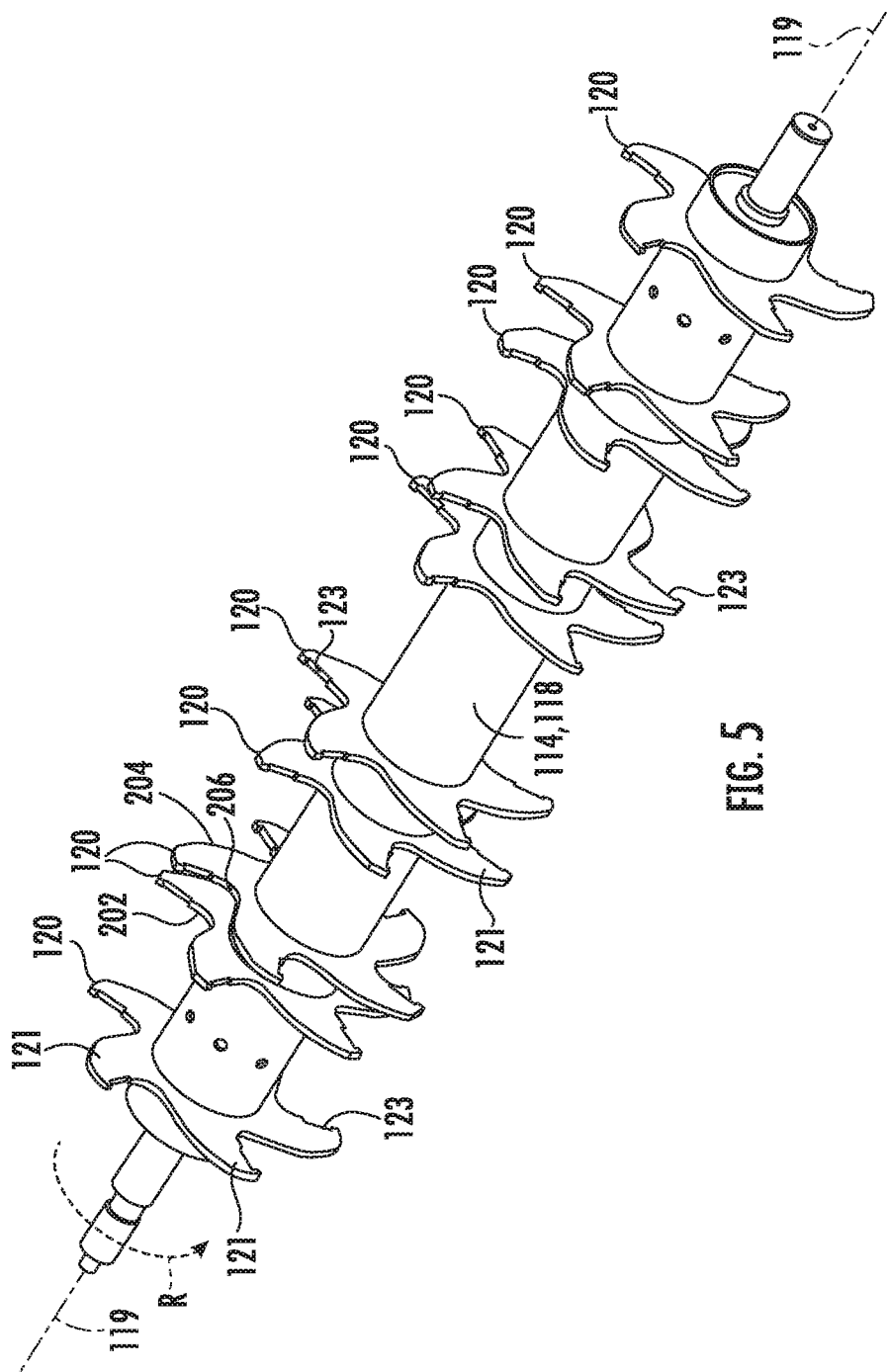
FIG. 5 is a perspective view of the elongate drum and rotor of FIG. 4 showing the spaced apart rings to which vanes are attached.

Referring to the Figures, an agricultural combine 100 comprises a chassis 10 supported by wheels 12. The agricultural combine 100 further comprises a feeder house 14 to which an agricultural harvesting head 16 may be attached. The feeder house is a generally rectangular box that contains a crop elevator (not shown). The crop elevator carries the crop to an accelerator drum 18, which further conveys cut crop into a threshing, separating, and cleaning system. The threshing and separating system comprise a rotor 20 disposed inside a concave 22. Crop is introduced between the rotor and the concave by the accelerator drum. The forward portion of the rotor and concave function to thresh the crop between them. The rear portion of the rotor and concave function to separate the now-threshed crop from the material other than grain (a.k.a. MOG or crop residue). The grain falls downward through apertures in the concave and into a cleaning system 24 which includes sieves and/or chaffers to further separate the grain from light crop residue particles. Once clean, the grain is lifted with a crop elevator 26 and deposited into a grain tank 28 from which it is later unloaded through an unloading auger 30.

Crop residue that is separated from the grain is carried rearward through the gap between the rotor 20 and the concave 22. The crop residue is eventually released from between the rotor and concave and falls downward into a system of chopping and spreading residue 32.

The system of chopping and spreading residue 32 comprises a chopper 102 and a residue accelerator 104 at the rear of the agricultural combine. The chopper is disposed to receive crop residue released from between the rotor 20 and the concave 22, to chop that residue into smaller portions, and to convey the chopped residue to the residue accelerator 104 which is located behind (downstream) of the chopper 102.

The system of chopping and spreading residue 32 also includes a crop spreader 112, shown herein as downwardly extending vanes attached to a generally planar and horizontal base plate 113 in a fan pattern. The crop spreader 112 is disposed behind the residue accelerator 104 to steer the chopped crop residue leaving the residue accelerator 104 into a broad fanlike pattern behind the combine.

The chopper 102 comprises an elongate drum 106 that extends transverse to the direction of travel of the agricultural combine and parallel to the ground, and several blades 108 attached to the drum (see, e.g., FIGS. 1, 2, 8, 9). The chopper further comprises a linear array 110 of stationary blades that interengage with the blades 110 attached to the drum 106 to cut the crop residue between the blades on the drum and the stationary blades. The elongate drum 106 is supported on bearings (not shown) that constrain the elongate drum 106 to rotate about a longitudinal axis 107.

The residue accelerator 104 is disposed behind and downstream of the chopper 102 to receive the chopped crop residue from the chopper 102, and to accelerate it.

The residue accelerator comprises a rotor 114 disposed in a housing, the rotor comprising an elongate drum 118 that is disposed generally parallel to the chopper drum 106. The elongate drum 118 is supported on bearings (not shown) that constrain the elongate drum 118 to rotate about a longitudinal axis 119 of the elongate drum 118. The longitudinal axis 119 is parallel to the longitudinal axis 107.

Several rings 120 are fixed to the surface of the elongate drum 118. These rings are spaced apart at regular intervals along the length of the elongate drum. Each ring 120 is generally planar and defines a plane that is perpendicular to the longitudinal rotational axis 119 of the elongate drum 118. Each ring 120 has a circular central hole that is welded to the outer surface of the elongate drum 118 and through which central hole the elongate drum 118 passes. The outer extent of each ring 120 defines a plurality of extensions such as teeth 121 (five extensions or "teeth" are illustrated in the figures herein) that extend outward from a central region of each ring 120. Each of these extensions or teeth 121 has a rake face 202, a back 204 and a gullet 206. Each of teeth 121 further defines an elongate slot 123. The elongate slot 123 extends radially outward from the outer surface of the elongate drum 118. The longitudinal extent of the elongate slot 123 is parallel to a radial line extending outward from the longitudinal rotational or rotating axis 119.

Figure 6:
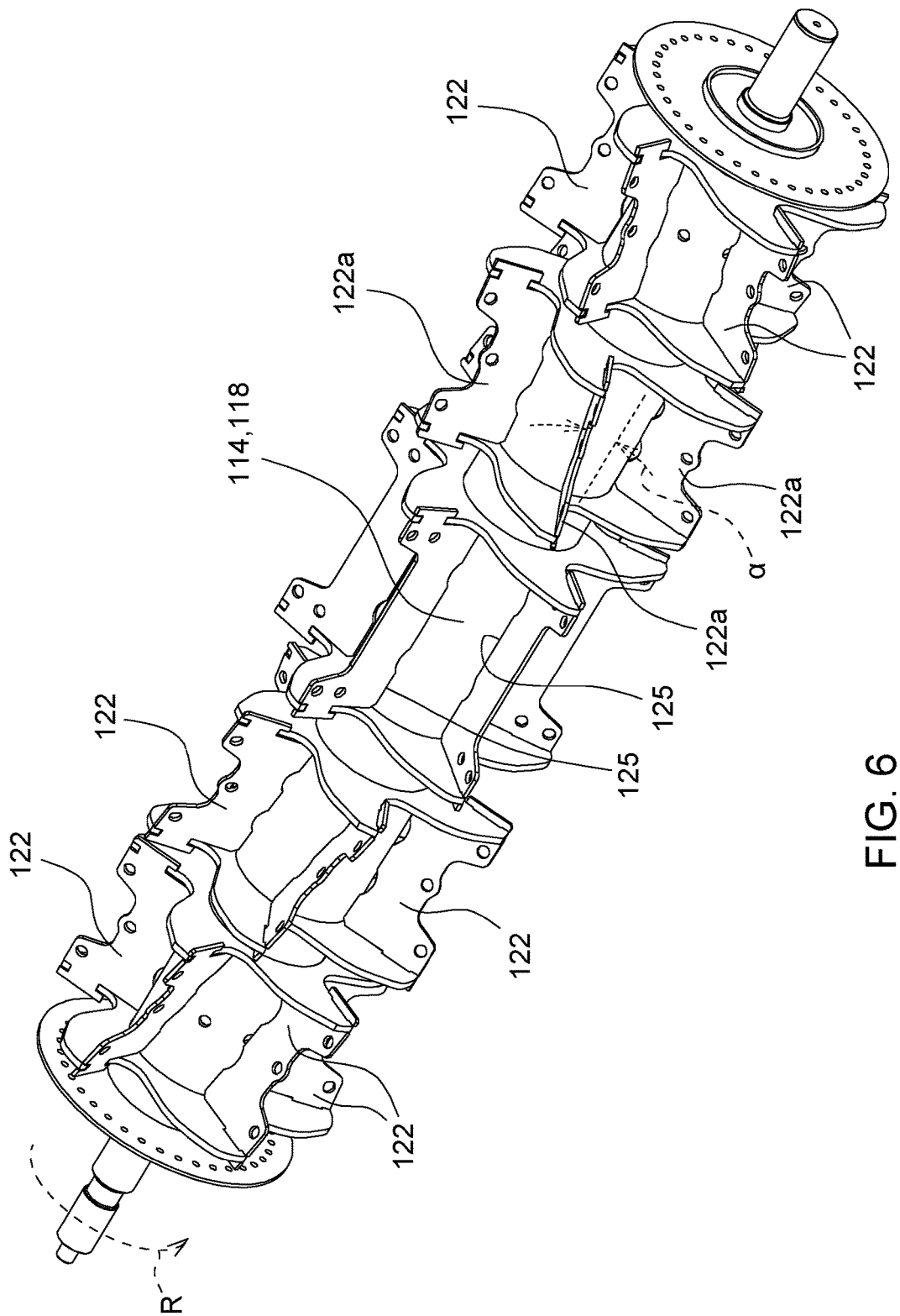
FIG. 6 is a perspective view of the elongate drum and rotor with rings of FIG. 5 to which vanes are attached.

Referring to FIG. 6, vanes 122 extend radially outward from the elongate drum and generally parallel to the longitudinal axis of the drum. The base of each vane abuts the elongate drum. Each end of the vanes 122 abuts a ring 120. Each end of the vanes 122 is welded to one of the radially extending elongate slots 123.

Each vane 122 is in the form of a planar plate that extends generally parallel to the longitudinal axis 119 and radially outward from the longitudinal axis 119.

Each vane 122 has a root portion 125 having an edge that extends generally parallel to the longitudinal axis 119, that abuts the outer surface of the elongate drum 118 and that is fixed (preferably by welding) thereto.

Thus, each vane 122 is therefore directly secured both to the elongate drum 118 and to the two rings 120 which it abuts.

Each vane 122 is provided with holes 127 that receive threaded fasteners 129 (see FIG. 7) that extend therethrough.

In a preferred arrangement, adjacent rings 120 are fixed to the elongate drum 118 such that one ring 120 is slightly angularly offset about the longitudinal axis 119 to a different angular position about the longitudinal axis 119. When the vanes 122 are attached to two adjacent rings 120 that are angularly offset in this manner, the vane 122 itself (see, e.g., FIG. 6, vanes 122a) is also angularly offset with respect to the longitudinal axis 119 at an angle α [alpha]. By disposing the vanes at a small angle alpha, they accelerate crop slightly to one side or other of the combine, instead of straight backwards. It should be noted that when two otherwise identical rings 120 are angularly offset in this manner, all of the vanes attached to the rings 120 (five in this embodiment) are offset in a similar manner, to a similar angle alpha.

Figure 7:
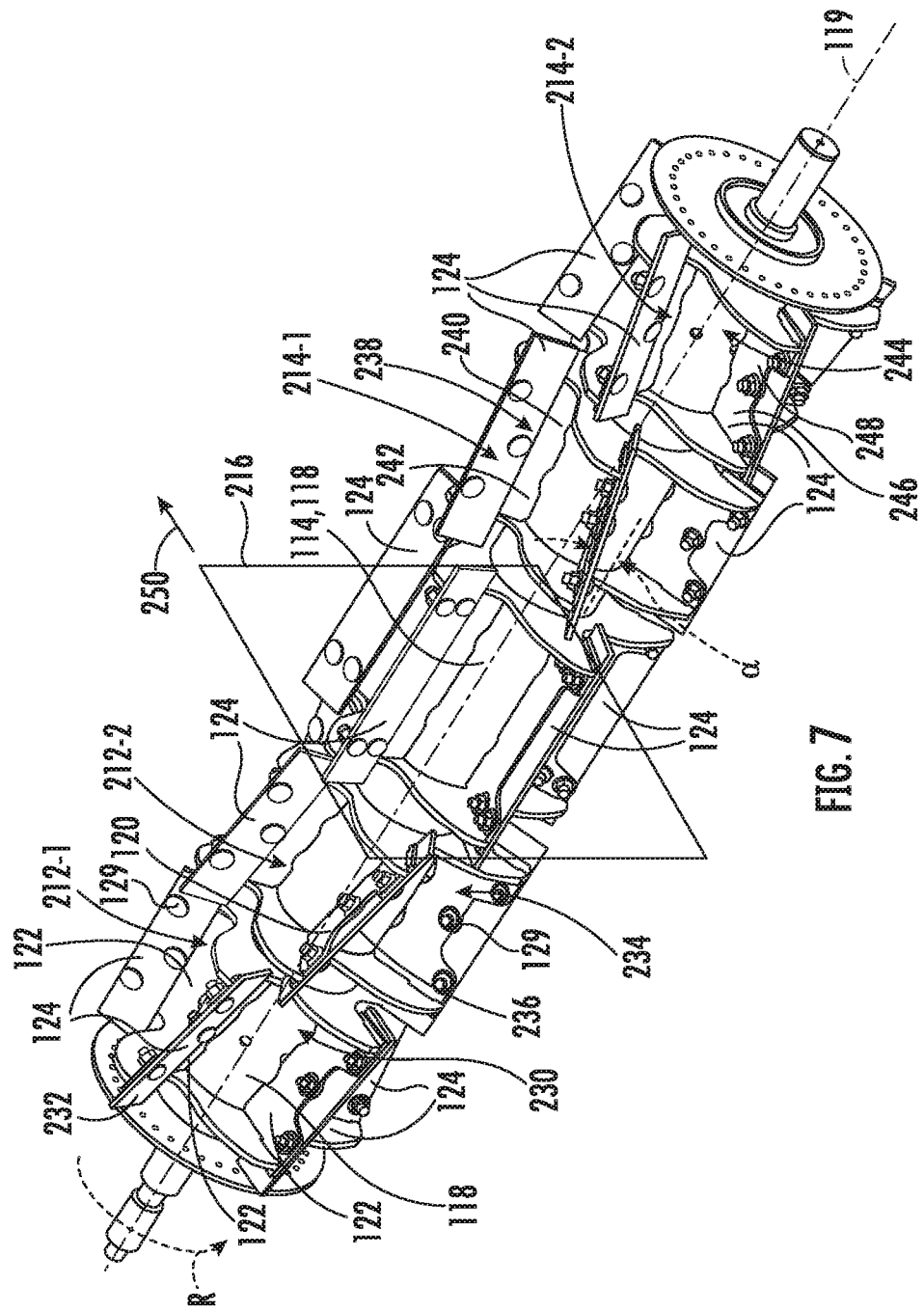
FIG. 7 is a perspective view of the elongate drum and rotor with rings, vanes, and vane extensions added.
Figure 8:
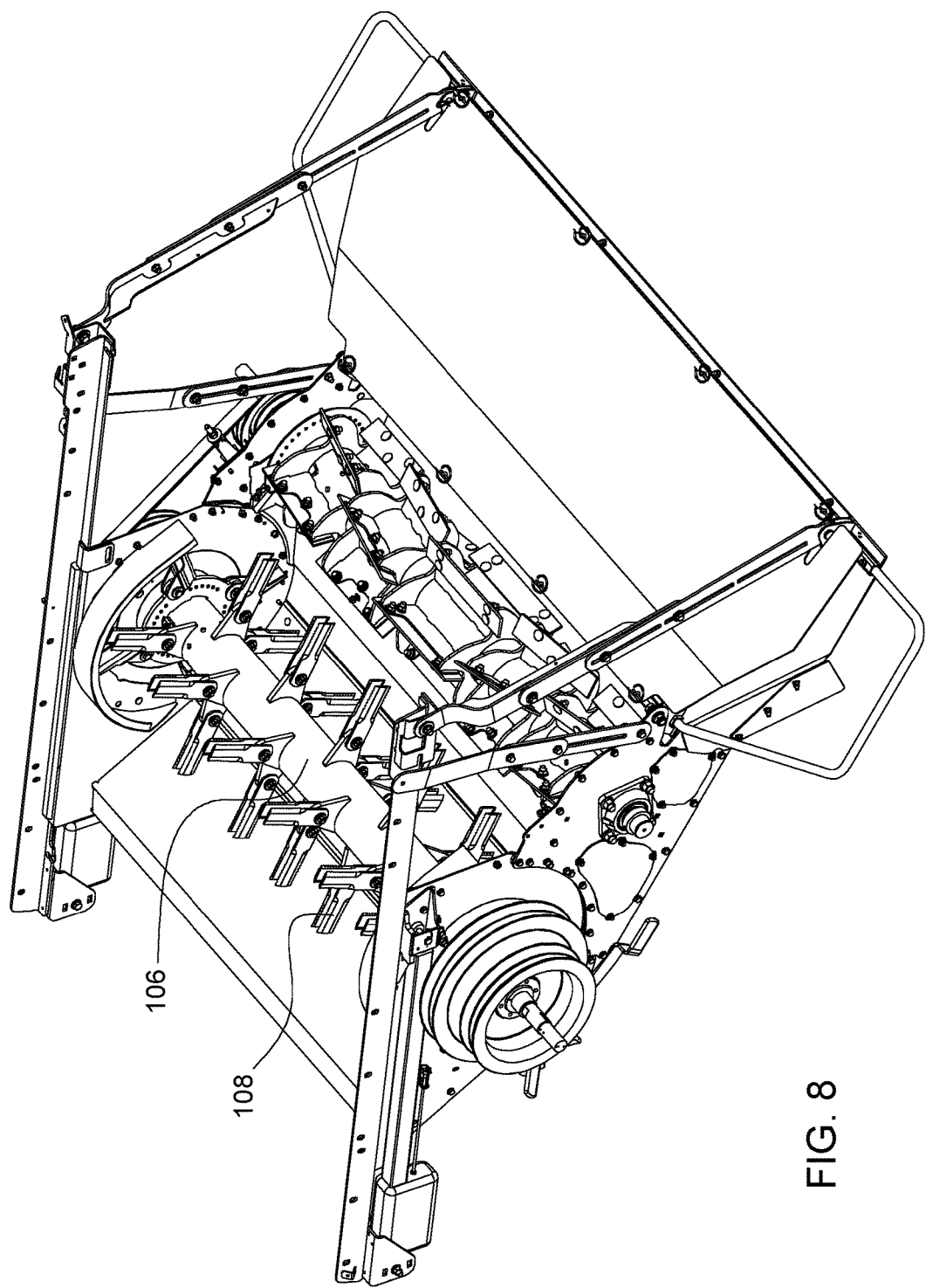
FIG. 8 is a left side elevated perspective view of the chopper and residue accelerator of the foregoing figures with the upper sheet metal covers enclosing the chopper and the residue accelerator removed.
Figure 9:
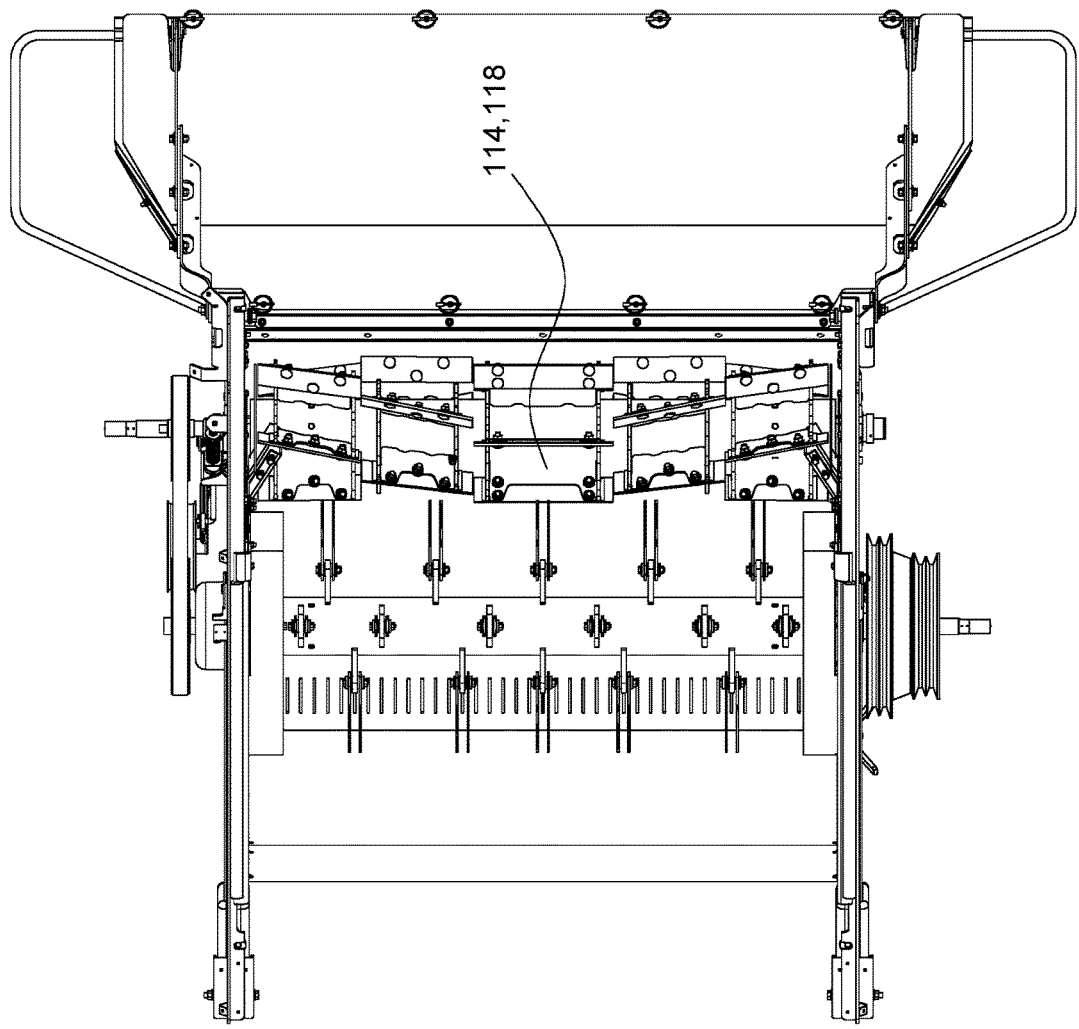
FIG. 9 is a plan view of the chopper and residue accelerator of the foregoing figures with the upper sheet metal covers enclosing the chopper and the residue accelerator removed.
Figure 10:
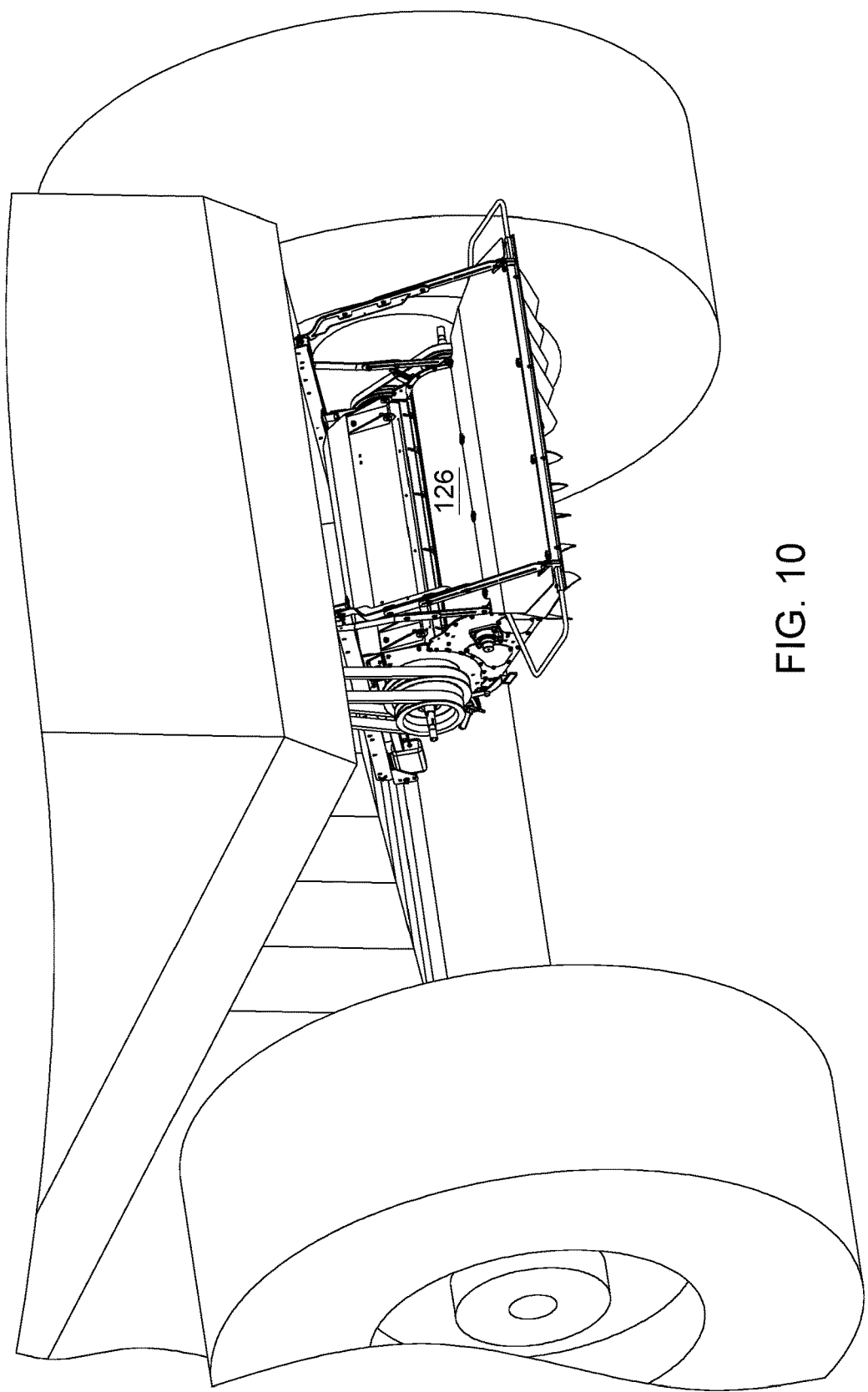
FIG. 10 is a fragmentary rear perspective view of the chopper and residue accelerator the foregoing figures with the upper sheet metal covers enclosing the chopper and the residue accelerator added.
Figure 11:
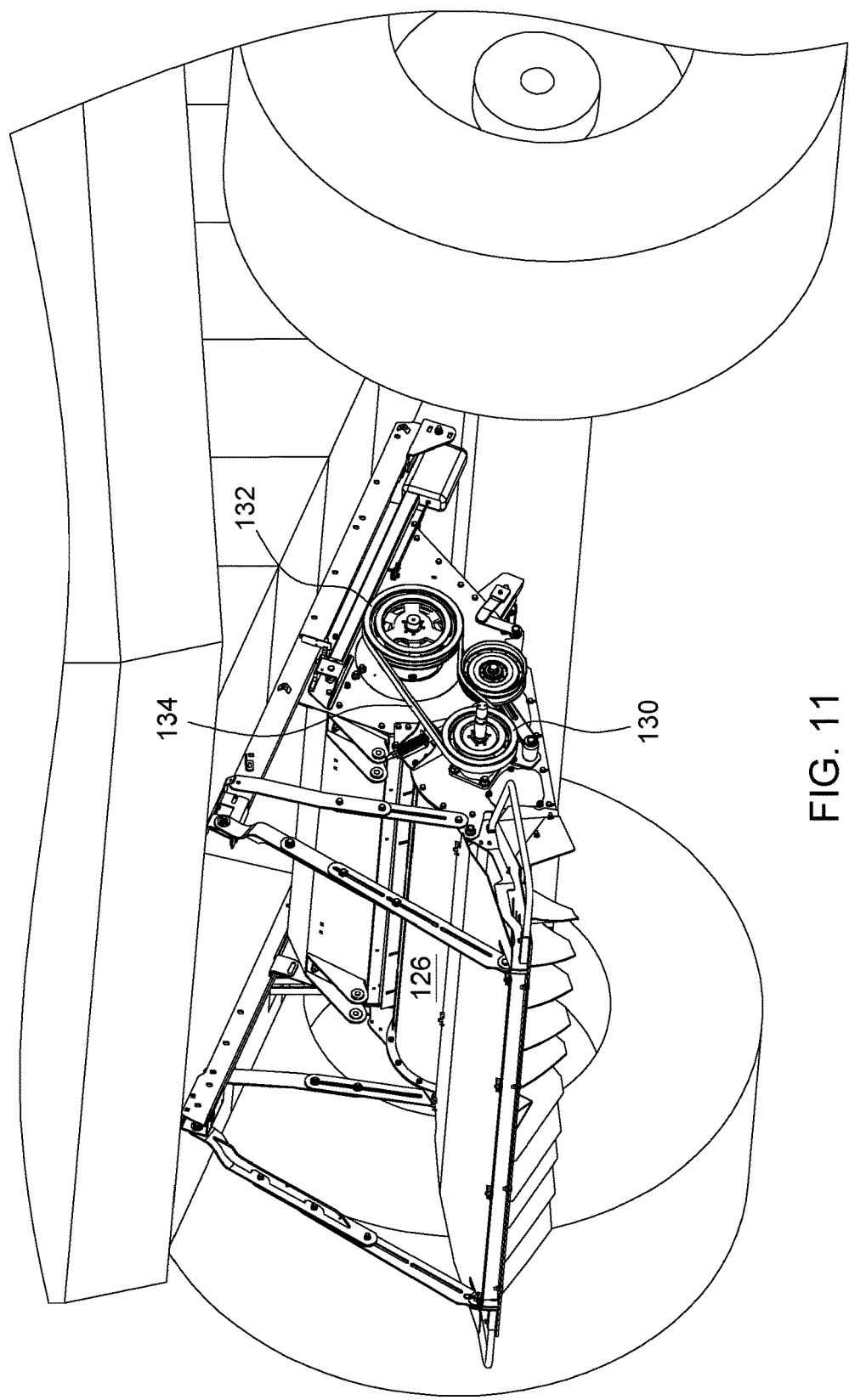
FIG. 11 is a fragmentary right side rear perspective view of the right side of the chopper and residue accelerator showing the belt and pulley arrangement for driving the residue accelerator.
Figure 12:
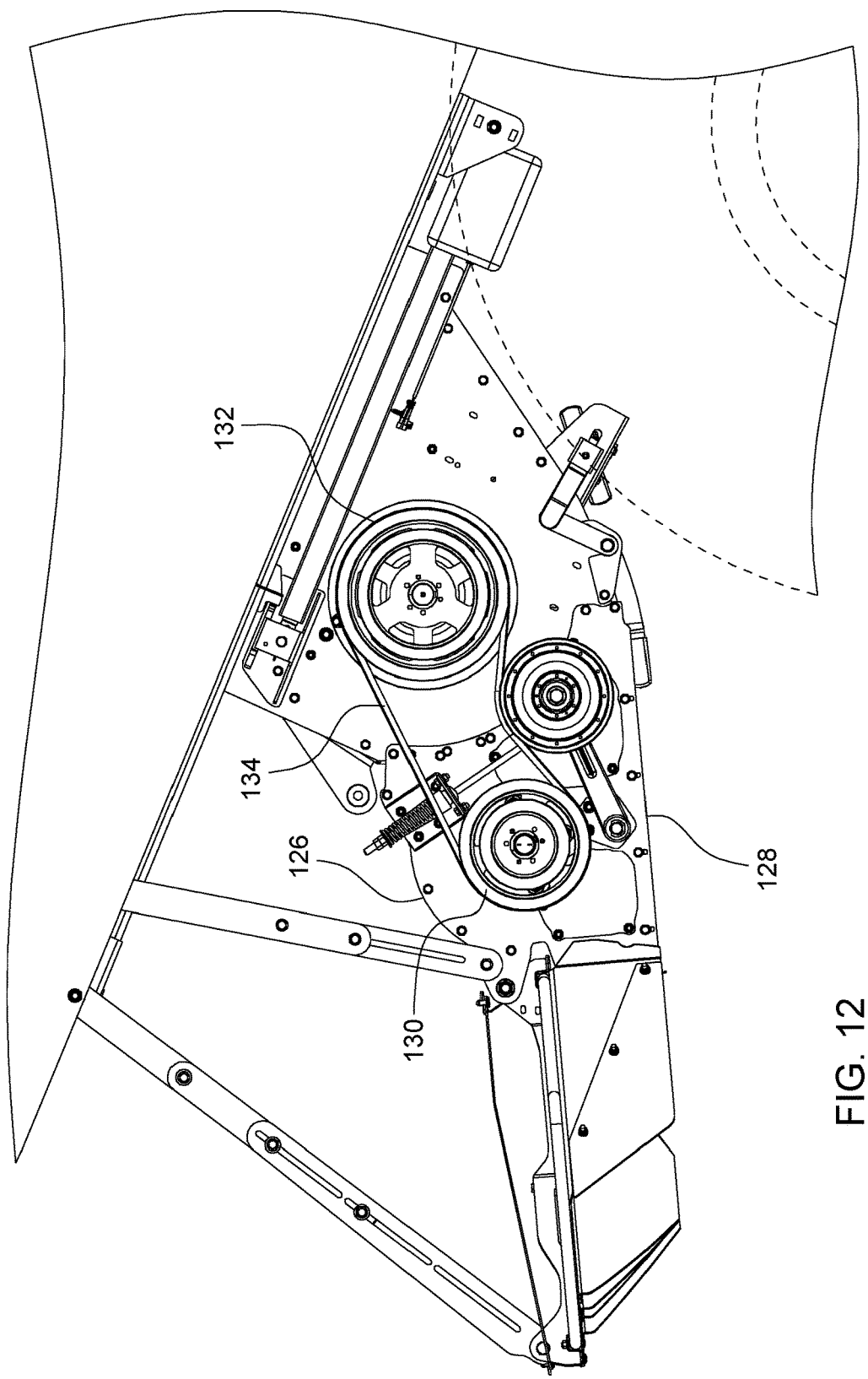
FIG. 12 is a fragmentary right side view of the belt and pulley arrangement for driving the residue accelerator.

Referring to FIG. 7, each vane 122 has an associated vane extension 124. Each vane extension 124 extends parallel to the vane 122 to which it is fixed. The vane extensions 124 extend generally parallel to, and spaced apart from the longitudinal axis 119 of the elongate drum 118. Each vane extension 124 is generally planar and extends radially outward from the elongate drum 118. Each vane extension 124 is removably fixed to its corresponding vane 122 so it can be readily removed and replaced when it is worn. Each vane extension 124 is provided with holes that receive threaded fasteners 129 that extend therethrough. Each vane extension 124 is fixed to its corresponding vane 122 and is coplanar with its corresponding vane 122. Thus, each vane extension 124 is disposed at the same angle alpha as the vane 122 to which it is attached.

Each threaded fastener 129 that secure the vane extensions 124 to the vanes 122 includes a bolt (preferably a rounded head stove bolt as shown in FIG. 7) that extend through the hole in the vane 122 and the corresponding and aligned hole in vane extension 124. Each threaded fastener 129 also includes a nut that is threaded onto the shank of the bolt.

As further shown by FIG. 7, rings 120 and vanes 122 form first and second drum encircling series of pockets 212-1 and 212-2 (collectively referred to as pockets 212) along the rotating axis 119 and third and fourth drum encircling series of pockets 214-1 and 214-2 (collectively referred to as pockets 214) along the rotating axis 119. Each of the drum encircling series of pockets 212 and 214 comprises a series of individual pockets between consecutive circumferentially spaced vanes 122 that collectively encircle the drum 118. The first drum encircling series of pockets 212-1 is circumferentially offset from the second drum encircling series of pockets 212-2 while the third drum encircling series of pockets 214-1 is circumferentially offset from the fourth drum encircling series of pockets 214-2. The first and second drum encircling series of pockets 212-1 and 212-2 are located on a first side of a plane 216 perpendicular to the rotating axis 119 and axially bisecting the elongate drum 118. The first drum encircling series of pockets 212-1 comprises a first pocket 230 having first vane 122 extending between a first pair of the plurality of rings 120 and having a first face 232 oblique to the plane. The second drum encircling series of pockets 212-2 comprising a second pocket 234 having second vane 122 extending between a second pair of the plurality of rings 120 and having a second face 236 oblique to the plane 216, both the first face 232 and the second face 234 facing the plane 216 in the rearward direction 250. The third series of drum encircling pockets 214-1 and the fourth series of drum encircling pockets 214-2 are located on a second side of the plane 216. The third series of drum encircling pockets 214-1 comprise a third pocket 238 having a third vane 240 extending between a third pair of the plurality of rings 120 and having a third face 242 oblique to the plane 216. The fourth series of drum encircling pockets 214-2 comprises a fourth pocket 244 having a fourth vane 246 extending between a fourth pair of the plurality of rings 120 and having a fourth face 248 oblique to the plane 216, both the third face 242 and the fourth face 246 facing the plane 216 in the rearward direction 250.

The residue accelerator housing is made of a first sheet metal panel 126 that extends around and encloses the upwardly facing portion of the rotor, and a second sheet metal panel 128 that extends around and encloses the downwardly facing portion of the rotor. A forward-facing gap between the first and second sheet metal panels defines an inlet of the residue accelerator, and a rearwardly facing gap between the first and second sheet metal panels defines an outlet of the residue accelerator. The residue accelerator rotor is driven in rotation such that chopped crop material is received in the inlet, is pulled underneath the rotor, and is ejected rearwardly through the outlet of the residue accelerator.

The residue accelerator is driven by a first pulley 130 fixed to one end of the elongate drum of the residue accelerator 104. A second pulley 132 is mounted to one end of the elongate drum of the chopper 102. An endless belt 134 is wrapped around these pulleys such that they are driven by a common power source (e.g. an engine, motor, or other rotating device). The two pulleys 130, 132, as shown in the attached figures have different diameters. Thus, they are driven at different rotational speeds.

The pulley 130 attached to the residue accelerator has a smaller diameter than the pulley 132 attached to the chopper 102. The residue accelerator 104 therefore rotates at a higher speed than the chopper 102. This enables the residue accelerator 104 to operate at a higher speed to accelerate the chopped material past the steering vanes of the crop spreader 112 and out the back of the combine, while permitting the chopper 102 to operate at a lower speed. This permits the chopper 102 to operate at a slower, more efficient, less power consuming speed than conventionally, while the residue accelerator 104 operates at a higher speed to accelerate the cut crop material at the rear of the combine. In this manner, the chopper 102 can be operated at a rotational speed that chops most efficiently (and cuts the MOG to a proper chopped length) and the residue accelerator 104 can be operated at a different speed that moves the chopped crop residue most efficiently. The net result is a reduction in power consumption, better spread of chopped crop residue, and better quality of chopped crop residue.

The invention claimed is:

1. A system of chopping and spreading residue in an agricultural combine comprises:
   a chopper disposed in a crop residue flow path to receive crop residue from a threshing and separating mechanism, the chopper having a rotational axis that extends horizontally and transversely to a harvesting direction of travel;
   a residue accelerator disposed downstream of the chopper to receive chopped residue from the chopper and to accelerate the chopped residue in a rearward direction;
   a residue spreader disposed downstream of the residue accelerator to spread the chopped residue accelerated by the residue accelerator;
   wherein the residue accelerator further comprises an elongate drum having a rotating axis that is disposed horizontally and transversely to the harvesting direction of travel of the agricultural combine, a plurality of rings extending about the elongate drum and fixed to the elongate drum, a plurality of vanes, each of the vanes extending between and fixed to a respective pair of the plurality of rings, a vane extension removably fixed to each of the plurality of vanes, and
   wherein the plurality of vanes and the plurality of rings form first and second drum encircling series of pockets along the rotational axis and third and fourth drum encircling series of pockets along the rotating axis, the first drum encircling series of pockets being circumferentially offset from the second drum encircling series of pockets and the third drum encircling series of pockets being circumferentially offset from the fourth drum encircling series of pockets, the first and second drum encircling series of pockets being located on a first side of a plane perpendicular to the rotating axis and axially bisecting the elongate drum, the first drum encircling series of pockets comprising a first pocket having a first vane extending between a first pair of the plurality of rings and having a first face oblique to the plane, the second drum encircling series of pockets comprising a second pocket having a second vane extending between a second pair of the plurality of rings and having a second face oblique to the plane, both the first face and the second face facing the plane in the rearward direction;

the third series of drum encircling pockets and the fourth series of drum encircling pockets being located on a second side of the plane, the third series of drum encircling pockets comprising a third pocket having a third vane extending between a third pair of the plurality of rings and having a third face oblique to the plane, and the fourth series of drum encircling pockets comprising a fourth pocket having a fourth vane extending between a fourth pair of the plurality of rings and having a fourth face oblique to the plane, both the third face and the fourth face facing the plane in the rearward direction.

2. The system of chopping and spreading residue of claim 1, wherein each of the plurality of rings has a plurality of extensions extending outwardly from a central region of each said ring, and further wherein the plurality of vanes extending between and fixed to each adjacent pair of rings is fixed to the extensions.

3. The system of chopping and spreading residue of claim 2, wherein each ring of the plurality of rings defines a central circular hole that extends about and is fixed to an outer surface of the elongate drum.

4. The system of chopping and spreading residue of claim 1, further comprising:
 a first pulley fixed to the elongate drum of the residue accelerator to drive the elongate drum in rotation;
 a second pulley fixed to the chopper to drive the chopper in rotation; and
 an endless belt through that extending around and coupling the first pulley and the second pulley, wherein the second pulley drives the first pulley in rotation.

5. The system of chopping and spreading residue of claim 4, wherein the first pulley has a smaller diameter than the second pulley, and further wherein the endless belt drives the first pulley at a higher rotational speed than the second pulley.

6. The system for chopping and spreading residue of claim 1, wherein the plurality of vanes comprise:
 a fifth vane having a first face extending parallel to the rotating axis and perpendicular to its respective adjacent pair of rings, wherein the first vane and the second vane are on a first axial side of the fifth vane and wherein the third vane and the fourth vane are on a second opposite axial side of the fifth vane.

7. The system for chopping and spreading residue of claim 6, wherein the second vane is on a fifth side of the first vane and faces a plane perpendicular to the rotating axis and wherein the third vane is on a second side of the fifth vane and faces the plane perpendicular to the rotating axis.

8. The system for chopping and spreading residue of claim 7, wherein the first vane, the second vane and the third vane each comprise flat planar plates.

9. The system for chopping and spreading residue of claim 1, wherein each of the rings comprises a series of circumferentially spaced teeth, each of the teeth having a tooth back, a rake face and a gullet adjacent the rake face, wherein each of the plurality of vanes has vane faces abutting the rake faces of its respective pair of the plurality of rings, wherein the first pair of rings comprises a first ring having a first set of circumferentially spaced teeth and a second ring having a second set of circumferentially spaced teeth, the first set of circumferentially spaced teeth being circumferentially offset relative to the second set of circumferentially spaced teeth.

10. The system for chopping and spreading residue of claim 9, wherein each of the vanes extends within the gullet from the elongate drum to an outer point of the rake face of its respective pair of the plurality of rings.

11. The system for chopping and spreading residue of claim 10, wherein each of the rake faces comprises a slot and wherein each of the vanes comprises a pair of T-shaped tabs having a neck and an enlarged head, wherein the neck is received within the slot and wherein the head is larger than the slot.

12. The system for chopping and spreading residue of claim 9, wherein the first vane has a root portion abutting and directly affixed to an outer surface of the elongate drum.

13. The system for chopping and spreading residue of claim 1, wherein the plurality of rings comprises:
 the first pair of rings are affixed to the first vane of the plurality of vanes; and
 the second pair of rings are affixed to the second vane of the plurality of vanes.

14. The system for chopping spreading residue of claim 13, wherein the plurality of vanes are circumferentially staggered about the rotating axis.

15. The system for chopping and spreading residue of claim 1, wherein the first vane comprises a plate, wherein the first face of the first vane comprises a radially extending notch in the plate and wherein the vane extension extends across the notch from a first side of the notch to a second side of the notch.

16. The system for chopping spreading residue of claim 1, wherein the residue accelerator is to be driven in rotational direction about the rotating axis, wherein each of vane extensions is behind its respective vane in the rotational direction.

17. The system for chopping and spreading residue of claim 1, wherein the first pair of rings comprises a first ring and a second ring axially spaced from the first ring and wherein the second pair of rings comprises a third ring axially spaced from the first ring and the second ring and a fourth ring axially spaced from the first ring, the second ring and the third ring.

18. An agricultural combine comprises a threshing system, a separating system, a cleaning system for separating grain from crop residue, and a system for chopping and spreading that residue in accordance with claim 1.

19. A system of chopping and spreading residue in an agricultural combine comprises:
 a chopper disposed in a crop residue flow path to receive crop residue from a threshing and separating mechanism, the chopper having a rotational axis that extends horizontally and transversely to a harvesting direction of travel;
 a residue accelerator disposed downstream of the chopper to receive chopped residue from the chopper and to accelerate the chopped residue;
 a residue spreader disposed downstream of the residue accelerator to spread the chopped residue accelerated by the residue accelerator;

wherein the residue accelerator further comprises an elongate drum having a rotating axis that is disposed horizontally and transversely to the harvesting direction of travel of the agricultural combine, a plurality of rings extending about the elongate drum and fixed to the elongate drum, a plurality of vanes, each of the vanes extending between and fixed to a respective pair of the plurality of rings, a vane extension removably fixed to each of the plurality of vanes;

a first pulley fixed to the elongate drum of the residue accelerator to drive the elongate drum of the residue accelerator in rotation;

a second pulley fixed to the chopper to drive the chopper in rotation; and an endless belt through that extending around and coupling the first pulley and the second pulley, wherein the second pulley drives the first pulley in rotation, wherein the first pulley has a smaller diameter than the second pulley, and further wherein the endless belt drives the first pulley at a higher rotational speed than the second pulley.

20. A system of chopping and spreading residue in an agricultural combine comprises:

a chopper disposed in a crop residue flow path to receive crop residue from a threshing and separating mechanism, the chopper having a rotational axis that extends horizontally and transversely to a harvesting direction of travel;

a residue accelerator disposed downstream of the chopper to receive chopped residue from the chopper and to accelerate the chopped residue;

a residue spreader disposed downstream of the residue accelerator to spread the chopped residue accelerated by the residue accelerator;

wherein the residue accelerator further comprises an elongate drum having a rotating axis that is disposed horizontally and transversely to the harvesting direction of travel of the agricultural combine, a plurality of rings extending about the elongate drum and fixed to the elongate drum, a plurality of vanes, each of the vanes extending between and fixed to a respective pair of the plurality of rings, a vane extension removably fixed to each of the plurality of vanes, wherein each of the rings comprises a series of circumferentially spaced teeth, each of the teeth having a tooth back, a rake face and a gullet adjacent the rake face, wherein each of the plurality of vanes has vane faces abutting the rake faces of its respective pair of the plurality of rings, wherein each of the vanes extends within the gullet from the elongate drum to an outer point of the rake face of its respective pair of the plurality of rings, wherein each of the rake faces comprises a slot, wherein each of the vanes comprises a pair of T-shaped tabs having a neck and an enlarged head, wherein the neck is received within the slot and wherein the head is larger than the slot.

* * * * *